INVENTORS
Harry J. Venema
George H. Studtmann
By Peter S. Lucyshyn
Atty.

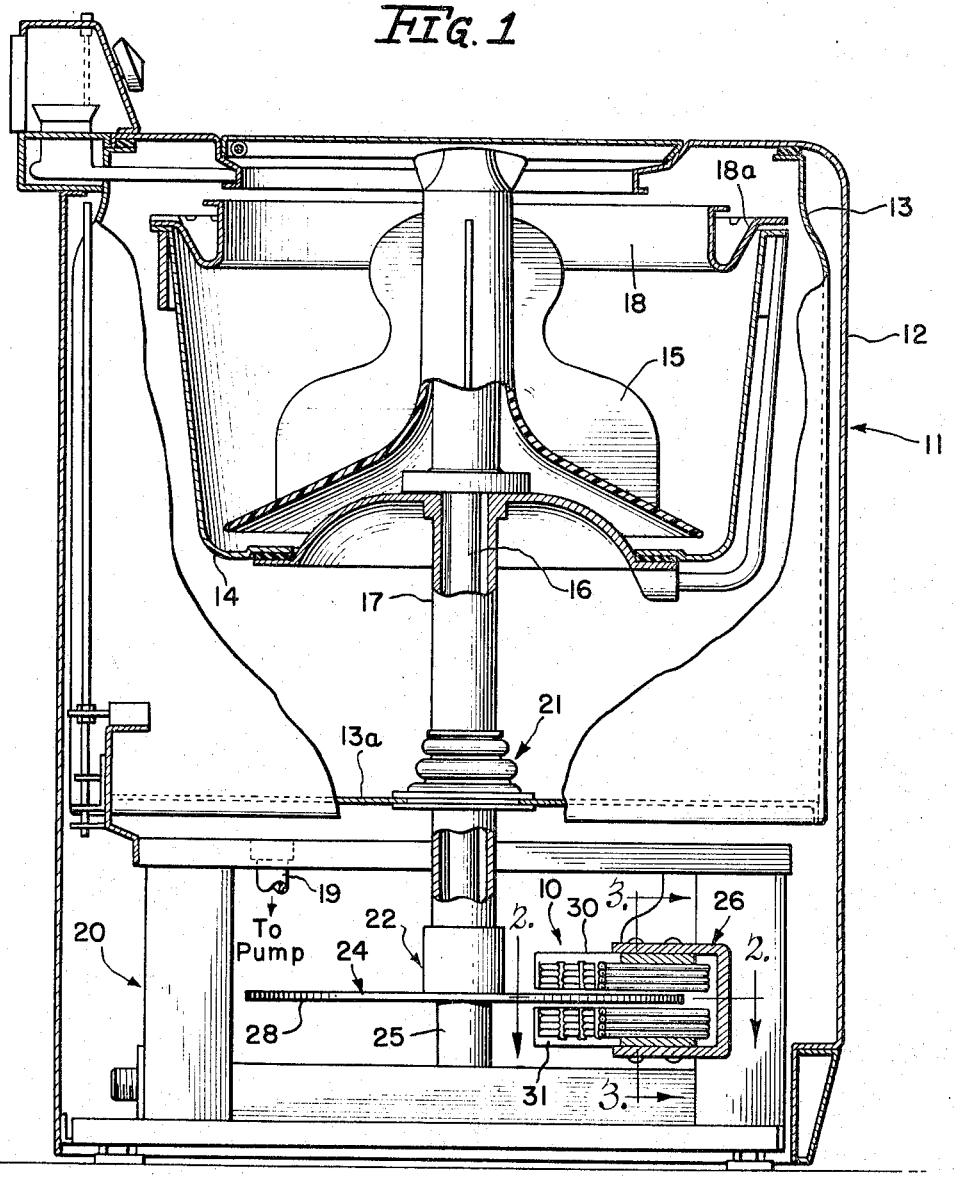
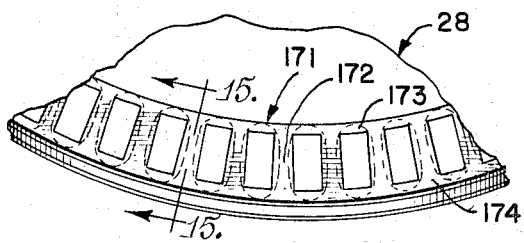
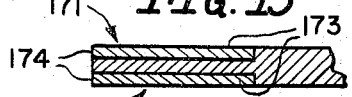

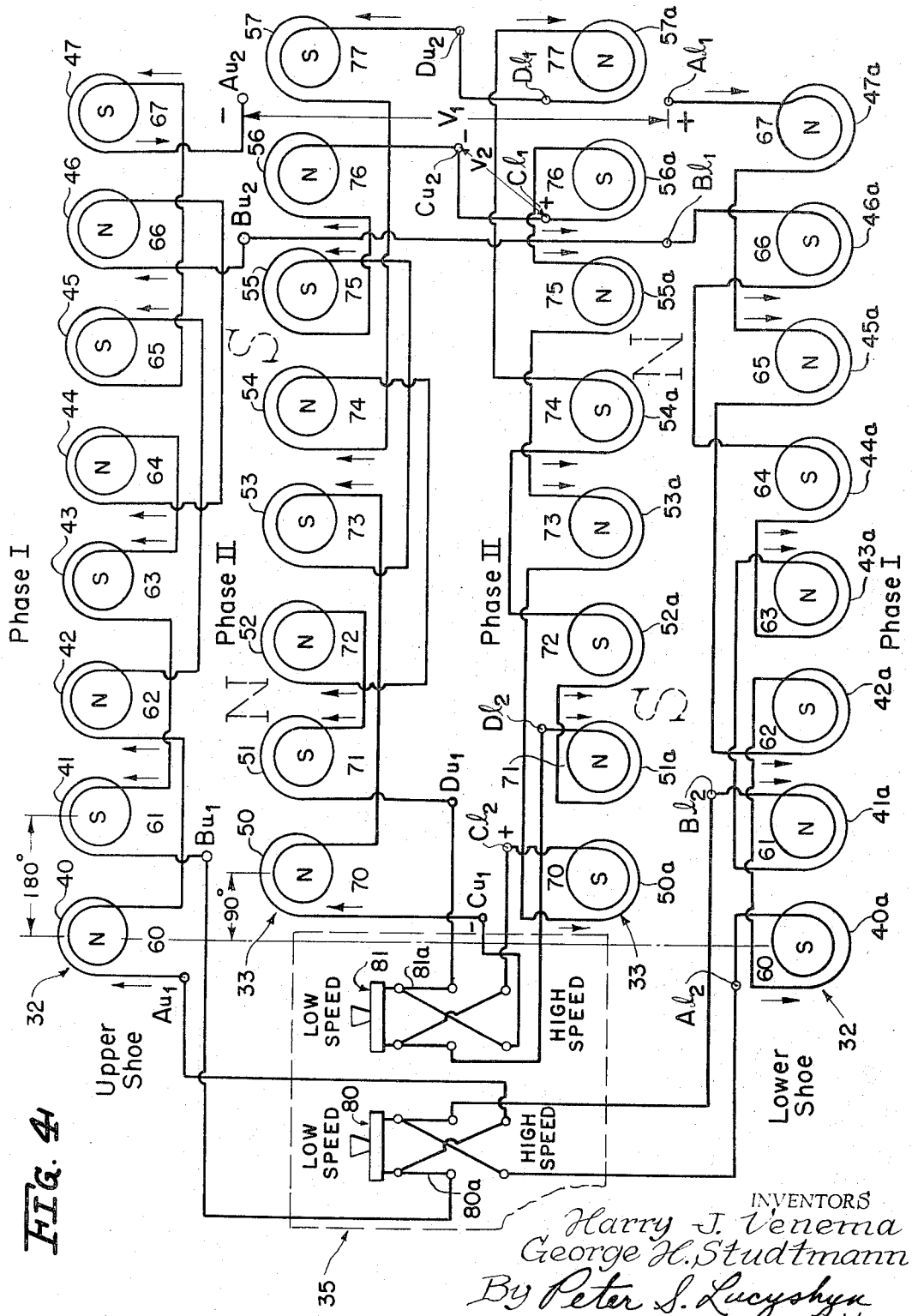

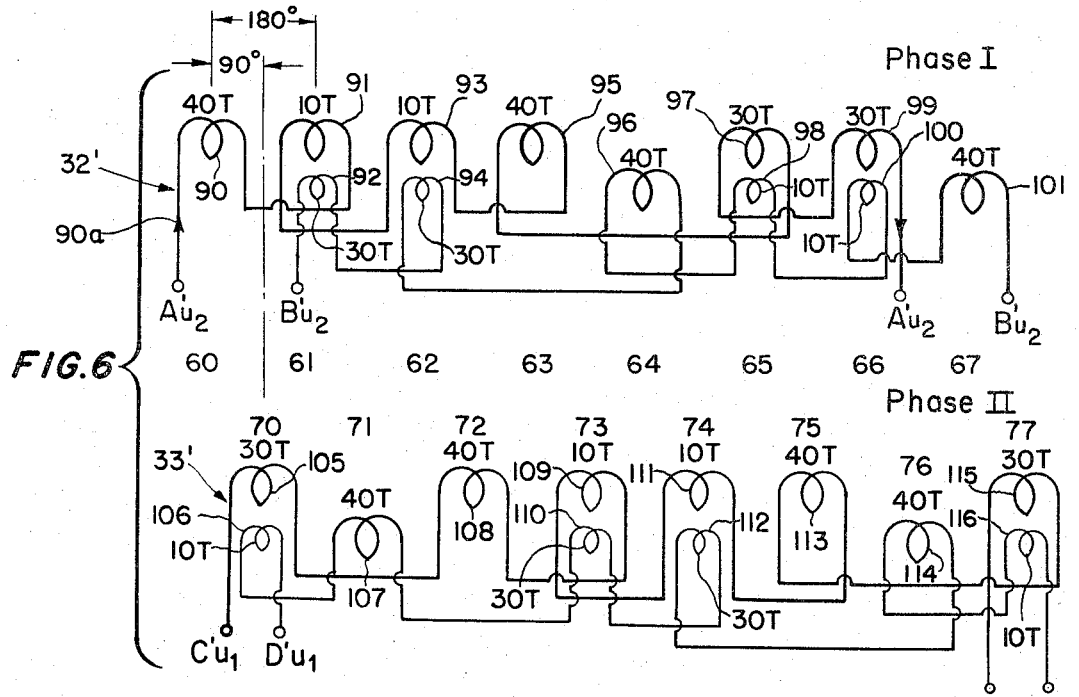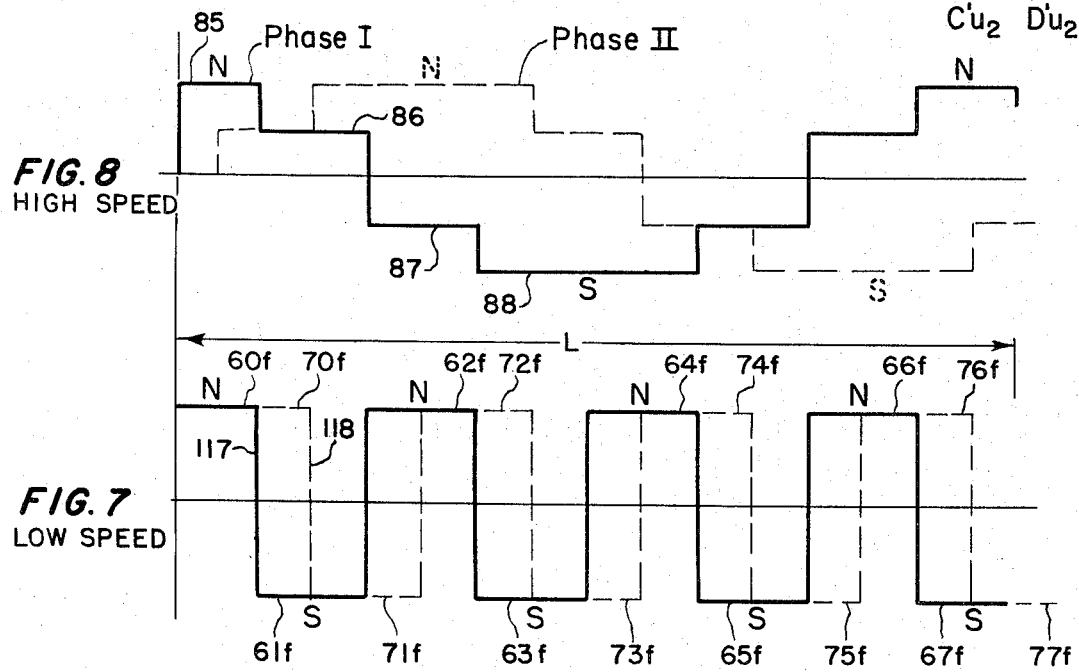

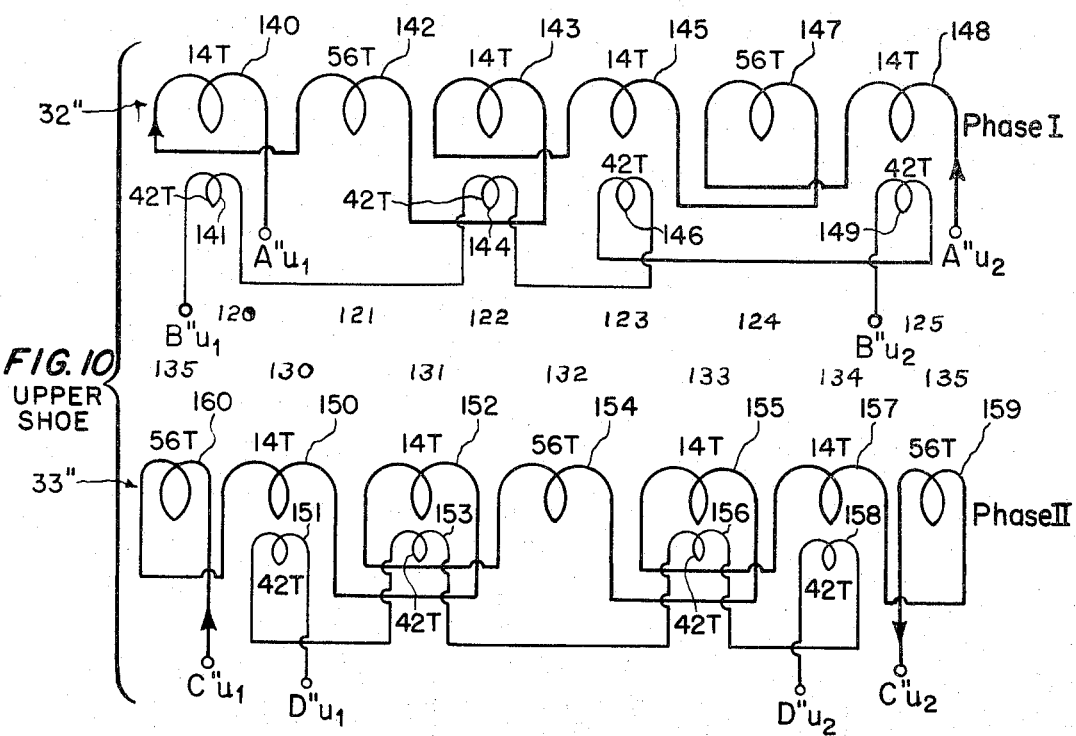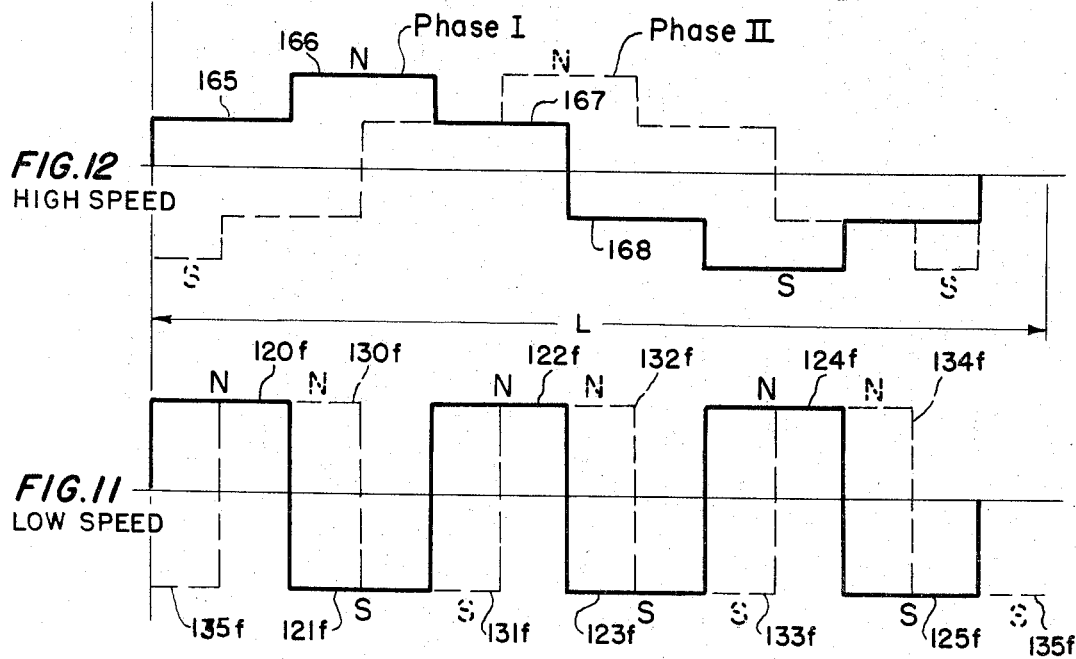

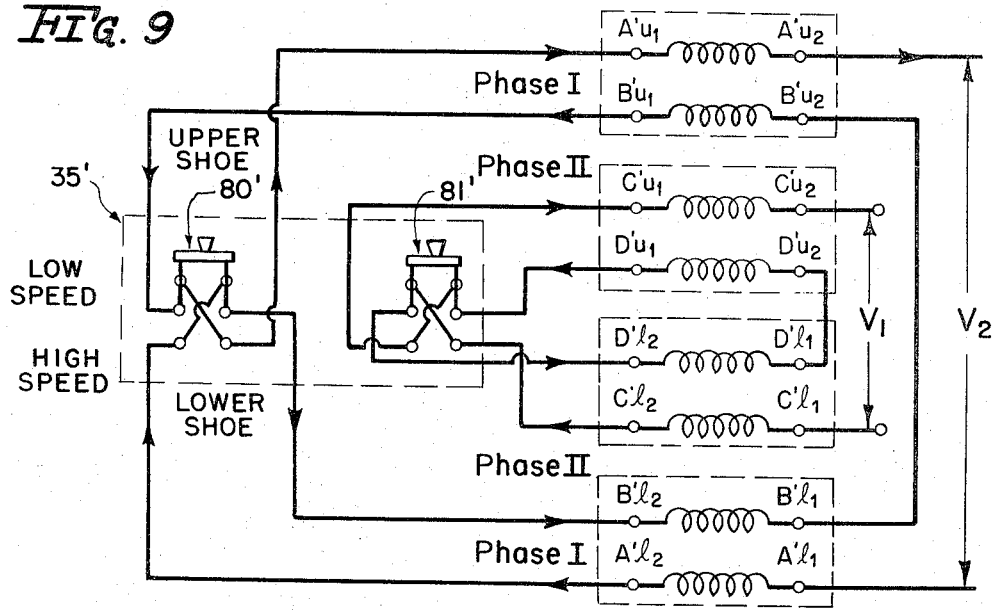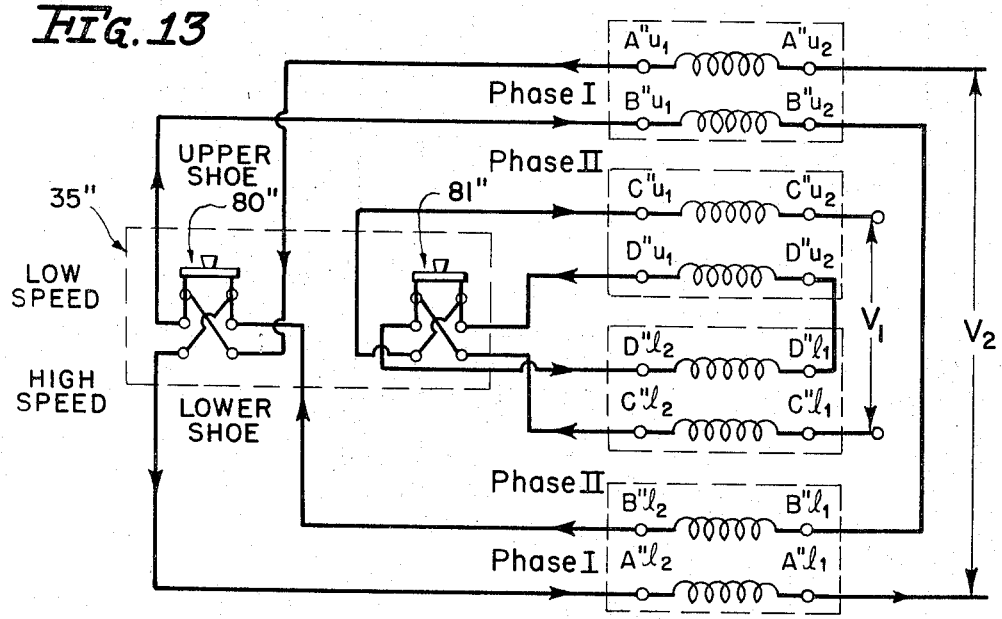

United States Patent Office 3,355,914
Patented Dec. 5, 1967

3,355,914
CLOTHES WASHING MACHINE AND
LINEAR MOTOR THEREFOR
Harry J. Venema, Wheaton, and George H. Studtmann,
Mt. Prospect, Ill., assignors to Borg-Warner Corporation, a corporation of Illinois
Filed Nov. 2, 1964, Ser. No. 408,209
8 Claims. (Cl. 68—23)

The present invention relates to linear motors and more particularly to improvements in the construction of the stator and armature in such motors.

Linear motors, as contemplated herein, include a stator magnetically coupled with an armature. One of the factors which determine the speed at which the armature moves or rotates is the number of alternate direction or polarity flux fields established by the stator and "cut" by the armature or moving member. Using as an example a motor with a rotor, given a predetermined number of alternate polarity flux fields established by the stator, the rotor turns at a predetermined speed. To decrease the rotor speed, the number of alternate direction flux fields is increased, while to increase the rotor speed, the number of alternate direction flux fields is decreased.

It is desirable to obtain different speeds in certain uses of linear motors. For example, if the motor is installed in an automatic washer, an agitator therein is oscillated at a slower speed than a basket is spun at. Accordingly, to eliminate a transmission and use direct drive, the motor must be selectively operated at high and low speeds, respectively. In present practice, separate sets of windings are provided on the stator to establish the predetermined number of alternate direction flux fields effecting corresponding high and low motor speeds, respectively. However, in these motors, at any given time, only one set of windings is used while another set remains idle. If the high-speed winding is being used, the low-speed winding is idle.

Furthermore, in a particular type of linear motor, known in the art as an eddy current linear motor, a substantial portion of the ampere-turns or MMF produced by the stator is used to overcome reluctance in the path of the flux threading through the stator and rotor. Thus, a substantial portion of the electrical power supplied to the motor is required to establish the magnetic field, i.e., used to create the exciting current, instead of being utilized to apply a torque to the movable member. Furthermore, problems are encountered in operating linear motors at high speed. In order to have smooth armature movement and normal force or torque applied to the armature, it is a requirement that the flux wave established by the stator approach, as nearly as practically possible, a sine wave.

Accordingly, it is an object of the present invention, in accordance with the above, to provide an improved linear motor usable in automatic washers and the like which utilizes the same stator windings to establish the respective number of magnetic poles necessary to effect predetermined high and low motor speeds.

It is a further object of the present invention to provide a linear motor having stator windings as set forth and controls therefor which are simply operable to select respective high and low speeds.

It is a more detailed object of the present invention in accordance with the above to provide a linear motor of the above type having improved stator and rotor structures providing a more efficient motor by requiring less magnetizing current in the stator windings to magnetically couple the stator and rotor.

In another of its aspects, it is an object of the present invention to provide a linear motor for use in automatic washers and the like with improved operation at high speeds, having a stator winding, which, at a setting of the controls for high motor speed, establishes a flux wave distribution resembling more nearly that of a sine wave, compared to a generally square flux wave distribution acceptable for operating the motor at low speed.

It is an overall object of the present invention to provide improved stator and rotor structures in a linear motor, the latter being economical to manufacture and efficient to operate, and permitting of versatile use because high and low motor speeds are easily selectable.

Others objects and advantages of the invention will become apparent upon reading the following detailed description and upon reference to the drawings in which:

FIGURE 1 is an elevation of an automatic washer with a partial section removed to show a linear motor embodying the present invention;

FIGURE 4 is a diagrammatic layout of the respective upper and lower stator phase windings showing their spatial relationship and controls for selectively reversing current in a portion of the respective windings;

FIGURE 6 is a schematic of an alternative embodiment of the invention showing only the respective phase windings on the upper shoe;

FIGURE 7 is a flux value versus stator position plot for a particular instant of time representing the flux pattern produced by the winding configuration of FIGURE 6 operated at low speed;

FIGURE 8 is a flux value versus stator position plot along the lines of FIGURE 7 with the stator windings energized for high rotor-speed operation;

FIGURE 9 is a schematic of the winding arrangement of FIGURE 6 showing controls for effecting low or high rotor-speed operation;

FIGURE 10 is a schematic of a second alternative embodiment of the present invention showing only the respective phase windings on the upper shoe;

FIGURE 11 is a flux value versus stator position plot for a particular instant of time representing the flux pattern produced by the winding configuration of FIGURE 10 operated at low rotor-speed;

FIGURE 12 is an instantaneous flux value versus stator position plot related to the winding configuration of FIGURE 11 for high-speed operation;

FIGURE 13 is a schematic of the winding arrangement of FIGURE 10 showing controls for effecting low or high rotor-speed operation;

FIGURE 14 is an enlarged perspective of a peripheral section of a rotor embodying the present invention;

FIGURE 15 is a section taken along 15—15 as shown in FIGURE 14;

Figure 2:
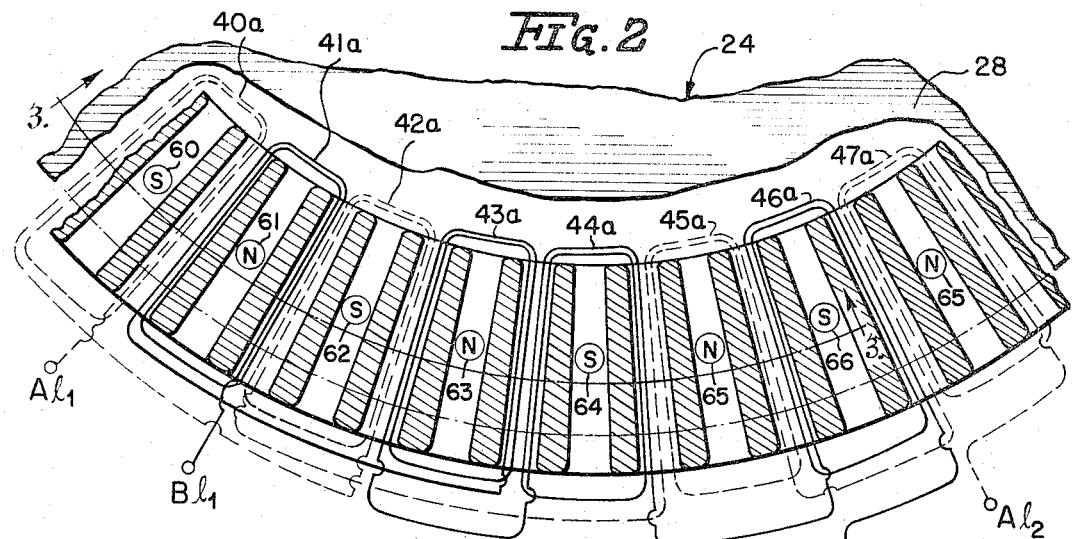
FIGURE 2 is an enlarged segmental portion of a rotor and a lower stator of the linear motor showing only one phase winding viewed along 2—2 in FIGURE 1.

While the invention will be described in connection with the preferred embodiment, it is understood that we do not intend to limit the invention to such embodiments. On the contrary, we intend to cover all alternatives, modifications, and equivalents as may be included within the spirit and scope of the invention as defined by the appended claims.

Turning now to the drawings, the present inventive linear motor 10 is embodied in an automatic washer 11. Shown in FIGURE 1 is an elevational view, partially in section, of the washing machine 11 including a cabinet 12 which encloses a tub 13 having rotatably mounted therein a basket 14 for receiving articles to be washed. The basket is imperforate in the present instance and carries coaxially therewith an agitator 15. Of course, a perforate basket can also be used. To effect washing of articles, water is fed into the basket 14 up to a preselected level and then the agitator 15 is oscillated by a first drive transmitting means, here shown as a shaft 16. After the clothes are washed and it is desired to remove the wash water and spin dry the clothes, the basket 14 is spun by a second drive transmitting means, herein shown as a drive shaft 17. The water is propelled by centrifugal force outwardly and then forced upwardly over the sides of the basket and into the tub 13. Though the basket 14 has an annular splash cover 18 to keep wash water from splashing over the sides during agitator operation, a plurality of perforations 18a in the cover facilitate spinning out of the wash water. A drain system, including a drain pipe 19 connected to a bottom 13a of the tub 13, removes water from the tub.

As herein illustrated, the tub 13 is supported on a frame 20 within the washing machine cabinet 12. The first drive shaft 16 is coaxially mounted inside the second drive shaft 17, both drive shafts extending upwardly through the tub bottom 13a, to connect to the agitator 15, and basket 14, respectively. To prevent leaking of water from the tub, the second drive shaft 17 is journalled in a sealing bearing 21 mounted in the tub bottom 13a.

To power the first and second drive shafts 16, 17, respectively, the linear motor 10 is mounted below the tub bottom 13a and coupled to the respective drive shafts by a selectively operable clutch assembly 22. The clutch 22 is of standard construction responsive to controls operative to effect transmission of oscillatory drive to agitator 15 from motor 10 through drive shaft 16, and unidirectional high-speed drive to basket 14 from motor 10 through the other drive shaft 17. The motor 10 includes a rotor 24 rotatably mounted on a support pedestal 25, and a stator 26 supported adjacent a peripheral edge 28 of the rotor by frame 20. The first illustrative embodiment of the rotor shown in FIGURES 1–3 and 14, 15 is constructed of suitable magnetically permeable material, such as iron, with inserts of electrically conductive material, such as copper, to define current flow paths for the induced eddy currents. The rotor 24 is described in detail in a later part of the description. The stator 26 is positioned sufficiently close to the rotor 24 so that a flux from the stator described subsequently, can easily thread through an air gap 34 between the stator and rotor.

Figure 3:
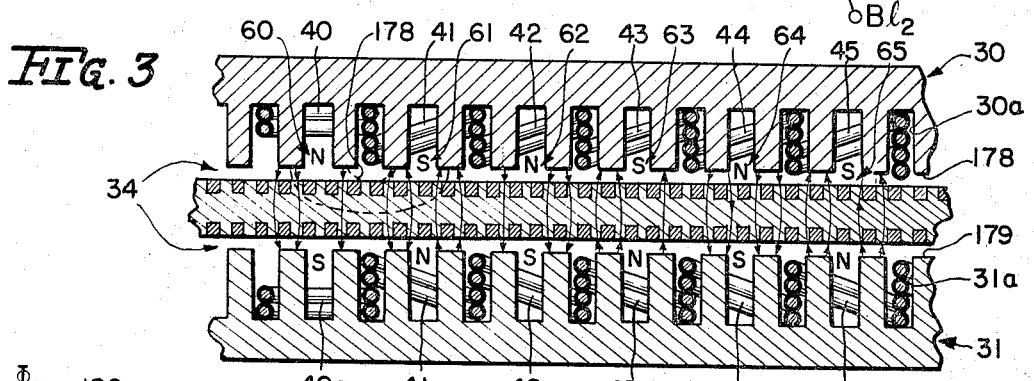
FIGURE 3 is an enlarged section of the rotor and stator taken along 3—3 as shown in FIGURES 1 and 2 showing both the upper and lower stators.

As herein illustrated, the stator 26 includes an upper shoe 30 and a lower shoe 31. The shoes are provided with a plurality of slots, 30a on the upper shoe and 31a on the lower shoe as best shown in FIGURE 3, to receive a pair of respective phase windings 32, 33 (see FIGURE 4). As is explained in detail subsequently, the first and second phase windings are wound on the respective shoes in predetermined offset spatial relationship, and energized by respective phase voltages $V_1$, $V_2$ (see FIGURES 5 and 18) different in the time phase relationship, so as to establish respective flux waves $\Phi_1$, and $\Phi_2$. The flux waves combine to effect a moving magnetic field, and according to well-known induction motor principles, the rotor 24 is rotated.

Figure 5:
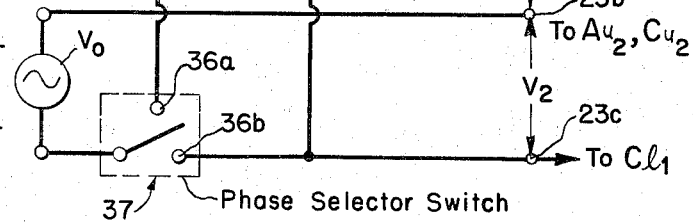
FIGURE 5 is a schematic of the energizing circuit for the respective stator windings shown in FIGURE 4.

A circuit 23, shown in FIGURE 5, is energized by a source voltage $V_0$ and has a capacitor 29 to shift timewise in the present instance, by 90 degrees, an output voltage. Thus, with a phase selector switch 37 connected to a switch terminal 36a, the output voltage $V_1$ applied to the first phase winding 32 appears across terminals 23a, 23b and the output voltage $V_2$ applied to the second phase winding 33 appears across terminals 23b, 23c. Voltages $V_1$ and $V_0$ are of course, in phase, being the same, while voltage $V_2$ is shifted by 90 degrees with respect to voltages $V_0$ and $V_1$. Operation of selector switch 37 to close switch terminal 36b effects a 90 degree shift of the voltage appearing at terminals 23a, 23b. With the shifted voltage applied to the second phase winding, the rotor operates in one direction, while with the shifted voltage applied to the first phase winding, the rotor operates in the opposite direction. The foregoing structure used to obtain two phase voltages is merely exemplary and, of course, other circuits which provide a phase shift of one output voltage with respect to another can be used. Indeed, a two phase source could also be used and a phase shift other than 90 degrees is acceptable.

In accordance with a first aspect of the present invention, a control assembly 35 is operable to reverse current flow in at least a portion of the respective first and second phase windings 32, 33 so that the same windings, utilized to establish a first number of alternate polarity flux fields to effect armature rotation at a first speed, are also used to establish a second number of alternate polarity flux fields to effect armature rotation at a second speed. As herein illustrated, the respective first and second phase windings have a plurality of branches wound on the upper and lower shoes 30, 31 respectively. The first phase winding includes a pair of upper and lower branches, one on each shoe: $Au_1$–$Au_2$; $Bu_1$–$Bu_2$; and $Al_1$–$Al_2$; $Bl_1$–$Bl_2$. The second phase winding includes a pair of respective upper and lower branches also: $Cu_1$–$Cu_2$; $Du_1$–$Du_2$; and $Cl_1$–$Cl_2$; $Dl_1$–$Dl_2$ (see FIGURE 4). Each of the branches includes a plurality of loops spaced over the length of the stator and wound in the stator slots 30a, 31a, respectively. In the preferred embodiment of FIGURES 1–4, each branch includes four loops.

Turning to FIGURE 4, the pair of first phase winding branches on the upper shoe 30 includes loops 40–47 and the pair of first phase winding branches on the lower shoe 31 includes loops 40a–47a. The pair of second phase winding branches on the upper shoe includes loops 50–57 and the pair of second phase winding branches on the lower shoe includes loops 50a–57a.

Explaining the relationship between the number of alternate polarity flux fields established by the stator and the rotor speed, the synchronous speed of the motor is given by the equation $n = 120f/kp$, wherein $n$ is revolutions per minute, $f$ is the frequency of the electrical source in cycles per second, $p$ is the number of alternate direction flux fields established over a segmental portion of the rotor, and $k$ is a ratio obtained as a result of dividing the portion of the rotor circumference over which the stator produced flux is effective by the total rotor circumference. This is necessary because the stator extends along only a portion of the rotor periphery. It is understood that in actual operation, the rotor does not run at synchronous but instead slips, the slip is important because the difference in speed between the travelling flux wave, which moves at synchronous speed, and the speed of the rotor itself, results in flux lines being cut. Thereby, induced voltages and currents are created in the rotor. If no flux lines are cut, i.e., the travelling flux wave and rotor move at the same speed, there are no induced currents in the rotor.

The loops on the respective upper and lower shoes are positioned so that by controlling direction of current flow, the number of magnetic poles established by the windings can be selected, thereby effecting rotation of the rotor at different speeds. There is no necessity for separate sets of windings in which each set is usable only for low-speed or high-speed operation. Instead, by following the teachings of the present invention in positioning and winding the loops of the respective branches, reversal of current flow in one of the branches will effect a change in the number of magnetic poles established by that phase winding. This, as is explained later, will in turn change the rotor speed.

Describing the winding structure of the first embodiment of FIGURES 1–4 in more detail, in the present instance, the upper stator shoe first phase winding 32 includes in branch $Au_1$–$Au_2$, loops 40, 42, 45, and 47 and in branch $Bu_1$–$Bu_2$, winding loops 41, 43, 44, and 46. The upper stator shoe second phase winding branch $Cu_1$–$Cu_2$ includes loops 50, 53, 55, and 56 while the other upper shoe phase winding branch $Du_1$–$Du_2$ includes loops 51, 52, 54, and 57.

In order to establish a magnetic field across the air gap between the upper and lower shoes of the stator, which field is cut by the peripheral portion 28 of the rotor, the phase windings on the respective shoes are wound and energized to establish complementary magnetic poles. For example, the lower shoe branches of the first phase winding are energized by the same voltage source as the upper shoe first phase winding, and they have their respective loops wound in a direction to establish magnetic poles below the rotor complementing the magnetic poles established by the winding loops above the rotor. The branches of respective first and second phase windings have complementary loops on the lower stator shoe identified by adding the suffix $a$ to the respective reference characters identifying the related upper winding loop as shown in FIGURE 4. The connection of the loops in each of the branches is not enumerated in detail as the loops are generally connected in the same pattern as the upper shoe loops.

In the exemplary embodiment, there are eight flux stations 60–67, established by the first phase stator windings. The first flux station 60 is established by loop 40 of the upper first phase winding and loop 40a of the lower first phase winding. For the instant of time selected, the upper loop 40 establishes a north pole N, while the lower loop 40a establishes a south pole S. Thus, as shown in FIGURE 3 using the commonly accepted convention for representing flux lines, the flux threads across the air gap 34 and through the rotor peripheral portion 28 from loop 40 to loop 40a. It is understood that the polarity of the loops changes because the voltage applied is an alternating voltage, however, the relationship of complementary magnetic poles above and below the rotor is maintained.

The second phase winding is wound to also establish a set of eight flux stations 70–77. The respective stations of the first phase winding and those of the second phase winding are spatially offset with respect to each other by a distance equivalent to 90 electrical degrees. Explaining with reference to FIGURE 4, the distance between adjacent flux stations, for example, stations 60, 61 of the first phase winding, is equivalent to 180 electrical degrees. Thus, a 90 degree offset distance with respect to flux station 60 would be a distance halfway between stations 60 and 61. Thus, the first flux station of the second phase winding, station 70, is positioned halfway between the adjacent flux stations 60, 61 of the first phase winding. This same positioning is followed in winding the remaining loops of the second phase winding, thereby effecting a 90 degree spatial offset relationship between the flux poles or stations established by the second phase winding with respect to the flux poles or stations established by the first phase winding.

Though in the diagrammatic representation of FIGURE 4 a single turn is shown to represent each of the winding loops, it is understood that the number of turns in a loop can be selected to effect the required ampere-turns for predetermined flux strength. In one practical structure, 40 turns for each of the loops provided the flux necessary to rotate the rotor at a desired speed and with a desired torque output.

The respective first and second phase winding branches are connected to the control assembly 35. In the exemplary embodiment, the latter includes a pair of double-pole, double-throw switches 80, 81 operative between a first position, in which the windings establish eight magnetic poles, and a second position, in which the winding loops cooperate to establish two magnetic poles. These first and second positions have been identified as low-speed and high-speed positions respectively in FIGURE 4. As herein illustrated, the first phase winding receives a voltage $V_1$ between branch terminals $Au_2$ and $Al_1$. The branch terminals $Bu_2$ and $Bl_1$ are connected together while the remaining four branch terminals $Au_1$, $Bu_1$, $Al_2$ and $Bl_2$ are connected to the switch 80.

For effecting high-speed operation of the motor, in the first phase winding a set of switch blades 80a are moved from low-speed position to high-speed position, and the current is thereby reversed in respective upper and lower branches $Bu_1$–$Bu_2$; $Bl_1$–$Bl_2$. The respective upper loops, 40, 41, 42, and 43 combine to establish one magnetic pole, for the instant of time selected, a north pole N. The remaining upper loops 44, 45, 46, 47 combine to establish a second pole of opposite polarity, in the present instance a south pole S. On the lower shoe, loops 40a, 41a, 42a, 43a combine to form a south pole S complementing the north pole N established by the corresponding loops on the upper shoe. Also, the remaining lower shoe loops 44a, 45a, 46a, 47a combine to form a north pole N complementing the south pole S established by the corresponding loops on the upper shoe. In other words, in the direction of rotor travel, two flux fields of opposite direction or polarity are established by the first phase winding. Thus, the number of alternate direction flux fields or "poles" established by the first winding of the stator is reduced from eight to two.

The current is reversed in a portion of the second phase winding 33 by the double-pole, double-throw switch 81, which in response to movement of a set of switch blades 81a from an upper position to a lower position, reverses current in respective second phase winding branches $Du_1$–$Du_2$ and $Dl_1$–$Dl_2$ to decrease the number of poles established by the winding. In other words, the upper loops 50, 51, 52, and 53 cooperate with lower loops 50a, 51a, 52a, and 53a to establish a flux field of one direction, for the particular instant of time selected, and the remaining four loops of the second phase winding, loops 54, 55, 56, 57 on the upper shoe and loops 54a, 55a, 56a, 57a on the lower shoe cooperate to establish a second flux field of an opposite direction to the flux field established by the aforementioned four winding loops in the second phase winding.

At this point, it is helpful to review the terms "flux poles" and "flux fields" as these apply to the inventive structure. As has been described, the upper stator phase windings establish poles along the stator arcuate length. These have been schematically designated as north or south poles and are associated, either with a single loop and identified with a reference character as a flux station, or with a plurality of loops or stations and identified simply as a high-speed N or S pole. Each of the poles has associated with it a flux field which threads across the air gap 34 between the upper and lower stator shoes 30, 31, through which the armature moves. In the present instance, the lower stator shoe carries a portion of the respective first and second phase windings so as to define complementary magnetic poles below those defined by the upper stator. In accordance with the commonly accepted convention for describing flux directions, flux lines leave a north pole and enter a south pole and must follow a continuous path, i.e., a flux path must close on itself. Thus, as shown in FIGURE 3, the flux leaves either an upper or lower magnetic north pole and enters a corresponding upper or lower south pole to establish a magnetic field across the air gap.

The requirement for effecting rotation of the rotor is that there are flux fields in the air gap which the rotor moves substantially perpendicular to. The "poles," P, of the aforementioned speed equation, $n=120f/kp$, in the present structure, are the alternate direction flux fields which the rotor periphery 28 cuts or moves through. Thus, even though there be a north pole above the rotor and a complementary south pole below the rotor adjacent to a second south pole above the rotor and a complementary north pole below the rotor, i.e., four magnetic poles, there are only two adjacent alternate direction magnetic fields. Thus, the term "poles" as used in the equation really refers to the two alternate direction magnetic fields established by two alternate polarity magnetic poles above or to one side of the rotor or armature 24. Thus, in this instance, $p$ equals 2.

Though there are windings on the lower stator, it is within the teachings of the present invention to merely provide a lower stator shoe of magnetically permeable material which defines a low reluctance return path for the flux crossing the air gap. The upper flux would thread through the air gap between the upper and lower shoes and complementary poles on the lower stator would automatically be established by the upper poles.

It is clear from the equation $n=120f/kp$ that establishment of selected different numbers of magnetic poles by the stator will effect different rotor speeds. That is, a greater number of magnetic flux poles established by the stator, increases the numerator of the equation and thus reduces N, the synchronous speed of the travelling flux wave. On the other hand, by reducing the number of magnetic flux poles established by the stator, the numerator is decreased and the synchronous speed is thereby increased.

In the illustrative embodiment, the control for reversing current in first phase winding branches $Bu_1$–$Bu_2$ and $Bl_1$–$Bl_2$ and second phase winding branches $Du_1$–$Du_2$ and $Dl_1$–$Dl_2$ is shown to be the pair of manually-operable, double-pole, double-throw switches 80, 81. It is, of course, understood that electronic controls may be incorporated in place of manually-operable switches to permit selection of the number of magnetic poles established by the stator. The important feature of the invention is that the same windings that are used to establish, in the present instance, eight poles on one side of the armature or eight flux fields through which the armature cuts to effect slow motor speed operation, are also used to establish two poles on one side of the armature or two flux fields through which the armature cuts to obtain high motor speed operation.

Another feature of the present invention is that the flux waves established by the respective first and second phase windings, upon actuation of the control 35 to the high-speed position, approximate that of a sine wave. To effect this end, in the illustrative embodiment as shown by FIGURES 6–9, the respective flux stations 60–67 of the first phase and 70–77 of the second phase are comprised of a particular configuration of winding loops. Turning to FIGURE 6, there-shown is first phase winding 32′ including respective winding branches $A'u_1$–$A'u_2$ and $B'u_1$–$B'u_2$. Also shown is a second phase winding 33′ with respective winding branches $C'u_1$–$C'u_2$ and $D'u_1$–$D'u_2$. These are the windings which would be positioned on the upper shoe 30 of the stator 26. Because the lower shoe 31 would have a similar winding configuration establishing complementary magnetic flux poles along the lines of the first embodiment of FIGURES 1–4, only the winding configuration for the upper shoe is described in detail.

Turning to the first phase winding 32′ and particularly to flux stations 61, 62, 65, 66, it is clear from FIGURE 6 that instead of having winding loops of one branch establishing the flux at these stations, there are winding loops from both of the branches $A'u_1$–$A'u_2$ and $B'u_1$–$B'u_2$ contributing to establish the total flux. In the second phase winding 33′, the flux stations 70, 73, 74, 77 have flux poles established by contributions from winding loops of both branches $C'u_1$–$C'u_2$ and $D'u_1$–$D'u_2$.

As shown in FIGURE 6, the first phase winding branch $A'u_1$–$A'u_2$ includes winding loops 90, 91, 93, 95, 97, 99 while the other first phase winding branch $B'u_1$–$B'u_2$ includes winding loops 92, 94, 96, 98, 100, 101. The second phase winding includes in branches $C'u_1$–$C'u_2$ winding loops 105, 108, 109, 111, 113, 115, while the other second phase winding branch $D'u_1$–$D'u_2$ includes winding loops 106, 107, 110, 112, 114, 116. In order to have equal value fluxes during low-speed operation, the respective flux stations 60–67 and 70–77, of the exemplary winding configuration, have a total of forty turns establishing the flux at each of these stations. As shown in FIGURE 6, and explained above, at some of the flux stations the total number of turns is comprised of portions from each branch, in the present instance thirty turns in the winding loop of one branch and ten turns in the winding loop of the other branch. Explained in a subsequent paragraph is the reason the desired high-speed flux pattern is obtained using the exemplary relationship between the number of turns in each of the winding loops at one of these two-winding-loop stations.

Figure 18:
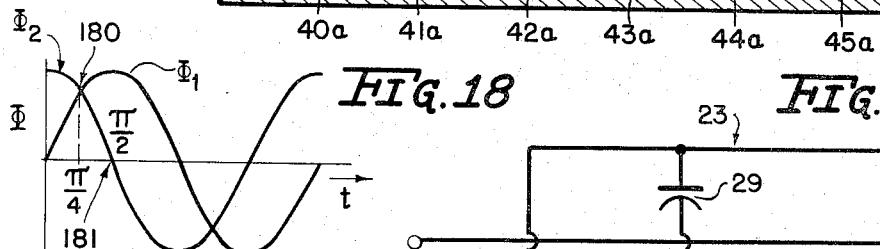
FIGURE 18 is a flux value versus time plot of the flux established in the respective first and second phase windings by the respective first and second phase voltages.

Plotted in FIGURES 7 and 8 is the flux value vs. position along an effective length L of the stator 26 for a particular instant of time. Because $V_1$ and $V_2$ are out of phase time-wise by 90 degrees, in order to show the flux waves established at each of the stations 60–67 and 70–77, an instant of time is selected when the respective first and second phase fluxes are of equal magnitude. As shown in FIGURE 18, such an instant is at point 180, $\pi/4$ radians after the first phase flux $\Phi_1$ has passed through zero magnitude and is on the way to maximum flux value. At the same instant, second phase flux $\Phi_2$, having been advanced by 90 degrees in respect of the first phase flux $\Phi_1$ because of the inclusion of the capacitor 29 in the motor energization circuit, has passed through its maximum value and is half-way to its zero value. At this point, the fluxes are .707 times their maximum value. The voltages $V_1$ and $V_2$ which produce the respective fluxes $\Phi_1$ and $\Phi_2$, of course, have the same 90 degree phase shift relationship with respect to each other. However, because the stator is inductive each of the flux waves lags time-wise, by 90 degrees, the respective voltage which produced it. It is also clear if the reference time selected for plotting the flux versus flux station position on the stator were at an instant when the first phase flux $\Phi_1$ was a maximum point 181 in FIGURE 18, the second phase flux $\Phi_2$ would be zero. This, of course, would not permit showing the relative positions of both the first and second phase fluxes as viewed along predetermined stations spanning the effective length L of the stator.

A plot is shown in FIGURE 7 of flux versus distance along the stator for a predetermined selected point of time, assuming one practical situation; that the applied voltages $V_1$ and $V_2$ are equal, that they are 90 degrees out-of-phase, and that the control 35′ is in position to effect operation at low-speed. Flux wave plot 117, shown in solid lines, represents the flux produced by the first phase winding 32′ at the selected instant of time and flux wave plot 118, shown in broken lines, represents the flux produced by the second phase winding 33′ at the same instant of time. The plot represents the flux produced by the stator at a particular instant as existent along the length of the stator showing the flux at each of the eight stations. The respective north, N, and south, S, poles established at the selected instant by the respective stations of the upper stator shoe 30 are plotted, and reference characters of the respective stations with a suffix "f" added identify the particular fluxes.

The plot of flux versus position along the stator is shown in FIGURE 8 with the controls 35′ set for high-speed operation of the motor. Relating FIGURE 6 to FIGURE 8, the first phase winding stations 60, 61, and 66, 67 respectively, contribute to form a high-speed flux pole for the instant of time selected of north polarity N. Contributing to formation of a second flux pole of south polarity S, are first phase winding stations 62, 63, 64, and 65. The second phase winding also forms two flux poles, one of north polarity, N, and another of south polarity S, respectively. A first set of second winding flux stations 70, 71, 72, 73 contribute to form the north pole N and a second set of winding flux stations 74, 75, 76, 77 form the south pole S. As shown in both FIGURES 7 and 8, the first and second winding flux poles 68, 78 and 69, 79 are offset by 90 electrical degrees with respect to each other to effect a moving magnetic field, this having been explained earlier in the specification.

An arrow 90a showing current direction in the winding 90 is representative of the other arrows in FIGURE 6, only one being identified to avoid unnecessary repetition. These arrows in FIGURE 6 show direction of current flow in the first and second phase windings at the particular instant of time selected, the controls 35' (see FIGURE 9) being in position to establish eight magnetic poles for low-speed motor operation. To change to high-speed operation, and, in the present instance, establish two magnetic poles on each side of the rotor, the control 35' is operated to reverse current in winding branches, B'$u_1$-B'$u_2$ of the first winding and D'$u_1$-D'$u_2$ of the second winding. The opposite polarity adjacent magnetic poles maintain adjacent flux fields in the air gap 34 with their respective flux lines oriented in opposite directions. Thus, in these branches, the current direction arrows would be reversed for the particular instant of time. The polarity of a flux established by a winding loop is dependant upon which one of two directions the current is flowing in, and whether the winding loop has turns of wire wound clockwise or counterclockwise as viewed in FIGURE 6. Placement of the winding turns and direction of current flow are related in determining polarity of the flux. In other words, reversal of current or reversal of the direction in which the windings are wound on the stator results in reversal of flux.

As herein illustrated, the control 35' includes a pair of switches 80', 81', for reversing current in branches B'$u_1$-B'$u_2$ and B'$l_1$-B'$l_2$ of the first phase winding and D'$u_1$-D'$u_2$ and D'$l_1$-D'$l_2$ of the second phase winding. The direction of current flow is controlled generally in the same manner as that for the illustrative embodiment of FIGURES 1–4, however, as is explained in the next succeeding paragraph, the winding configuration is different so as to provide a flux wave for high-speed operation which generally approximates that of a sine wave.

The flux plot in FIGURE 8 represents the flux at each of the stations identified vertically above in FIGURE 6 for the particular instant of time selected. As shown at 85 in the flux plot of FIGURE 8, the first phase winding loop 90 at station 60 in the illustrative embodiment, establishes a flux of a strength proportional to the selected current value flowing in first phase winding 32' multiplied by the number of turns, i.e., forty. Flux station 60 cooperates with the other flux stations of the first phase winding, as is explained subsequently, to establish a high-speed flux. For the particular instant, the flux at station 60 is of maximum value and of a north polarity. The adjacent station 61, instead of establishing a flux of north polarity and equal in strength to the flux at station 60, such being the result of reversing control 35 of the structure showing in FIGURES 1–4, the flux at station 61 as indicated by 86 in FIGURE 8, is of north polarity, however, only one-half the strength of the flux at station 60. This is because the thirty turns in loop 92 of first phase winding branch B'$u_1$-B'$u_2$ establish the controlling flux for the instant of time, a north polarity flux, however, the ten turns in winding loop 91 of first phase winding branch A'$u_1$-A'$u_2$ establish a flux counteracting the flux established by the winding loop 92. Thus, the net flux is the same as that which would be established by twenty turns, which of course, for the same current value, is one-half the flux strength which is established by forty winding turns. The next adjacent flux station 62 also has a half-strength flux identified on the plot by reference character portion 87, however, the half-strength flux established at station 62 is of opposite, south polarity to the half-strength flux established at station 61. This is because the dominant flux, produced by the thirty winding turns of winding loop 94, is in such a direction as to establish a south pole, the ten winding turns of winding loop 94 being subtractive. The first phase winding flux stations 63 and 64 including respective winding loops 95, 96 establish a maximum value south pole, as shown at 88 in FIGURE 8, for the particular instant of time selected. Thus, as the flux pattern along an effective length L of the stator is viewed in FIGURE 8, it generally follows that of a sine wave. This has been found to be an especially advantageous flux configuration for obtaining smooth and efficient operation at high speed.

The flux pattern produced by the second phase windings upon operation of control 35' to reverse current in winding branches C'$u_1$-C'$u_2$ and C'$l_1$-C'$l_2$ is shown in broken lines in FIGURE 8. The winding loops 105–116 positioned along the stator length L, as schematically shown in FIGURE 6, appear in the drawings above that portion of the flux, plotted in FIGURE 8, which they produce. In operation, the windings establish a flux in generally the same manner explained regarding the first phase winding. Thus, the second phase winding is not described in detail.

Though the illustrative embodiment of FIGURES 6–9 shows a winding arrangement and controls therefor which permits selection of either eight flux poles for low-speed operation or two flux poles for high-speed operation, the present invention is much more versatile. As an example of this, FIGURES 10–13 show a winding arrangement and controls therefor which permit slow-speed operation with six magnetic poles and high-speed operation with two magnetic poles.

Turning now more particularly to FIGURE 10, there-shown are respective stator flux stations 120–125 for phase one and 130–135 for phase two. A first phase winding 32" includes a pair of branches A"$u_1$-A"$u_2$ and B"$u_1$-B"$u_2$. A second phase winding 33" includes two branches C"$u_1$-C"$u_2$ and D"$u_1$-D"$u_2$. The upper shoe portion of the first phase winding branches A"$u_1$-A"$u_2$ and B"$u_1$-B"$u_2$ are comprised of winding loops 140, 142, 143, 145, 147, 148 and winding loops 141, 144, 146, 149, respectively. The upper shoe portion of the second phase winding branches C"$u_1$-C"$u_2$ and D"$u_1$-D"$u_2$ are comprised of winding loops 150, 151, 153, 155, 156, 158, 160 and winding loops 152, 154, 157, 159, respectively. As is noted from the drawings schematically depicting the inventive structure, end windings 159 and 160 respectively establish half-width magnetic poles in order to maintain a 90 degree spatial shift between respective end loops of the first and second phase windings while efficiently utilizing the stator length.

In one practical application of the invention, it was found that particularly advantageous operation was obtained by providing a total of 56 turns in the winding loops which define the individual stations. This total number of winding turns is exemplarily comprised of 14 turns in one winding loop and 42 turns in the other winding loop at a particular two winding loop station, or by a 56 turn winding loop at a two winding loop station.

Along the lines of the previously explained operation of the embodiment of FIGURES 6–9, selecting a flux station having two winding loops, one having 42 turns and the other having 14 turns, the flux established thereby can be adjusted as to strength and polarity by selecting direction of current flow in the respective winding loops. Assuming that at a particular instant of time the flux produced by the winding loop with 14 turns is additive with respect to the flux produced by the winding loop with 42 turns, a flux value of full strength is established, i.e., a flux value corresponding to current flow in 56 winding turns. On the other hand, if the flux established by the winding loop with 14 turns is subtractive, then the net flux at the particular station is one-half of the full strength, i.e., the flux strength is equivalent to that resulting from the same current flowing in 28 winding turns. The polarity of the specific flux at the respective stations is determined by the polarity of the dominant flux, which of course, is the flux of the winding loop with the larger number of turns.

As shown in FIGURES 11 and 12, the individual flux stations cooperate to form a flux pattern along the effective length L of the stator. It is, of course, understood, as explained earlier, that the flux magnitudes will vary with time at each of the stations, moving from a maximum value of a first polarity through zero to a maximum value of a second opposite polarity. Shown in FIGURE 11 is a plot of low-speed flux showing the respective north and south polarities established by the first phase and second phase winding stations 120–125 and 130–135 respectively, using the station reference characters with a suffix $f$ added. As explained with reference to FIGURES 7 and 8 of the first alternative embodiment, the drawings generally show a vertical alignment between the plot of the flux and the schematic diagram of the winding loops at the respective stations.

Turning to FIGURE 12, thereshown is a plot of the flux produced by the first and second windings for high-speed operation of the motor. As indicated by 165 in FIGURE 12, the flux contributed by first phase flux station 120 is equivalent to that of 28 winding turns, because for the instant of time selected, the flux of winding loop 140, exemplarily selected as having 14 turns, is "bucking" the flux of winding loop 141, exemplarily selected as having 42 turns. As indicated by 166, the adjacent station 121 has a flux established by one winding loop of 56 turns establishing a flux of full strength. The next succeeding station 122 establishes a flux value for the particular instant of time selected, of one-half full strength, indicated by 167, while the flux station 123 adjacent to station 122 establishes a flux of half-strength but of opposite polarity, i.e., south polarity and identified by 168. Thus, it is clear that the pattern of the high-speed flux wave generally follows that of a sine wave, as did the flux pattern established by the alternative embodiment of FIGURES 6–9 when control 35' was actuated for high motor speed operation. Again, in the second alternative embodiment of FIGURES 10–13, only the upper shoe winding loops are shown in the schematics. There, of course, is a set of lower shoe winding loops establishing fluxes of complementary polarity to produce a flux field threading across the air gap 34 through which the rotor peripheral portion moves. As has been explained, the number of alternate direction flux fields cut by the rotor are determinative of the rotor speed.

Shown in FIGURE 13 is a current control 35'' with switches 80'', 81'', for reversing current in selected portions of the respective first and second phase windings. The current is reversed in first phase winding branches $B''u_1-B''u_2$ and $B''l_1-B''l_2$ by switch 80'' and in second phase winding branches $C''u_1-C''u_2$ and $C''l_1-C''l_2$ by the second switch 81''. It is within the teachings of the present invention to use other switching controls, for example, electronic ones.

Shown in FIGURES 14 and 15 is a rotor construction in which the body of the rotor 24 is constructed of magnetically permeable material, such as iron for example, and has provided along its periphery 28, a lattice work 171 of conductive material, copper for example. As herein illustrated, the lattice work 171 includes radial cross-pieces 172 extending between inner and outer substantially flat rings 173, 174 also constructed of copper and mounted on the upper and lower peripheral portions of the rotor respectively. As shown in FIGURE 14, circular current paths are defined by the lattice work 171 for the eddy currents resulting from the induced EMF. The latter is created by the peripheral portion 28 of the rotor cutting through the flux field between the respective upper and lower shoes 30, 31 of the stator.

In order to prevent "locking" or "cogging" of the rotor and stator, the radial crosspieces in the lattice 171 are dimensionally related to respective sets of upper and lower stator teeth 178, 179 (see FIGURE 3) so that the flux produced by the individual crosspiece on the rotor from induced currents therein and the flux produced by the individual stator teeth does not align. If that were to occur, there is a tendency for the rotor to "lock" or "cog" with the stator and result in step-like rotation of the rotor 24. One example of a rotor lattice work 171 which does not permit cogging is one having approximately five rotor lattice work crosspieces within the cross-sectional area of a single stator tooth.

Figure 17:
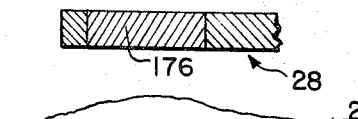
FIGURE 17 is a section taken along 17—17 in FIGURE 16.
Figure 16:
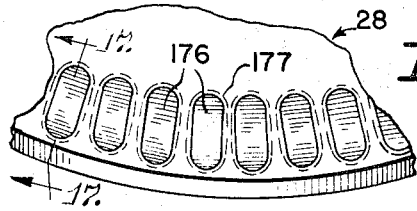
FIGURE 16 is an enlarged perspective of a peripheral section of another rotor showing an alternative embodiment of the present invention.

In FIGURES 16, 17 is an alternative embodiment of the rotor which, instead of utilizing magnetically permeable material for the peripheral portion 28, uses conductive material. Thus, the rotor peripheral portion itself presents the lowest resistance paths for the induced eddy currents. However, low reluctance paths must be provided for the flux to pass through the rotor. This is effected, as shown in the exemplary embodiment of FIGURES 16, 17 by providing inserts 176 along the periphery 28 of the rotor which are constructed of magnetically permeable material. Thus, the flux which threads through the air gap between the upper and lower stators tends to follow a path through that portion of the rotor periphery which includes the magnetically permeable inserts 176. Again, there is a relationship that is maintained between the area beneath the stator teeth occupied by the rotor inserts 176 and the stator teeth to prevent cogging or stepping operation of the rotor. The inserts are constructed of predetermined width related to the stator tooth cross-section size so that the flux produced by induced currents 177 in the rotor flowing about the inserts, as indicated in FIGURE 16, does not align with the individual fluxes produced by the stator teeth.

In practice, a rotor of the latter construction has the particular feature of preventing "clacking." Explaining, the air gaps 34 are maintained small in order to keep the reluctance in the flux path at a minimum. In practice, exemplary measurements are: .010 inch thickness for the air gaps above and below the rotor and .060 inch thickness for the rotor. The iron presents a low reluctance path through the rotor in either rotor construction, FIGURES 14, 15 or FIGURES 16, 17. However, in the rotor construction of FIGURES 14, 15 there is an opportunity for the flux to thread through the low reluctance path of the rotor between adjacent north and south poles on one side of the rotor (see FIGURE 3). The result is the rotor is drawn against the poles and "clacks" in. The rotor construction of FIGURES 16, 17 does not permit flux to thread along the arcuate length of the rotor between adjacent poles because the rotor is made of copper i.e., high reluctance. Inserts of iron are installed to permit easy vertical passage of flux through the rotor periphery 28.

We claim:

1. In an electrical motor energizable by an A-C source, the combination comprising a frame, an armature movably supported by said frame, a stator supported on said frame and positioned in predetermined spaced relation to said armature, a first winding wound on said stator to establish a first set of flux stations producing a flux varying time-wise in magnitude and polarity as a function of applied first phase voltage, a second winding wound on said stator to establish a second set of flux stations producing a flux varying time-wise in magnitude and polarity as a function of applied second phase voltage, said respective first and second windings wound with said respective first and second winding flux stations spatially offset so that an effective flux resulting from the combined fluxes produced by contributions of each winding moves as a function of time relative to said stator, control means coupled to said respective first and second windings and operable to reverse currents in at least a portion of said first and second phase windings, respectively, said control means in a first position effecting current flow through said windings so that said fluxes at said respective stations combine to establish a first number of individual magnetic poles in said first winding and in said second winding, respectively, moving as a function of time relative to said stator, said control means in a second position effecting current flow through said windings so that said fluxes at said respective stations combine to establish a second number of individual magnetic poles in said first winding and in said second winding, respectively, moving as a function of time relative to said stator, said first number of poles effecting a first armature speed and said second number of poles effecting a second different armature speed.

2. The combination of claim 1 wherein predetermined ones of said flux stations of both said first phase and said second phase windings include at least two winding loops and current flow is controlled individually through said winding loops to establish a generally sinusoidal flux pattern along an effective length of said stator for a selected instant of time.

3. In an electric motor energizable by an A-C source, the combination comprising a frame, an armature movably supported by said frame, a stator supported on said frame and positioned in predetermined spaced relation to said armature so as to permit relative movement therebetween, first and second windings on said stator energizable by said A-C source to establish a first moving flux field which couples said stator and said armature, said first winding and second winding each including a plurality of respective loops positioned in predetermined spatial relationship and responsive to energization by said A-C source to establish respective loop fluxes, said fluxes varying in magnitude and polarity with time in a predetermined first sequence with respect to each other and combining to define said first moving flux field each winding establishing a first number of individual magnetic poles, control means coupled to said winding loops and selectively operable to effect individual loop flux variations in a predetermined second sequence with respect to each other, said loop fluxes varying according to said second sequence and combining to define a second moving flux field each winding establishing a second number of individual magnetic poles, said first number of magnetic poles effecting armature movement at a first speed and said second number of magnetic poles effecting armature movement at a second different speed.

4. The combination of claim 3 in which said armature is a substantially flat circular member having respective electrically conductive and magnetically permeable portions positioned in predetermined spaced relationship to reduce the reluctance in a flux circuit coupling said stator and rotor and orient flow of induced currents in said rotor along predetermined paths.

5. In a washing machine the combination comprising a frame, a tub for holding liquid supported by said frame, a basket rotatably mounted within said tub for receiving articles to be washed, an agitator mounted in said basket for relative movement with respect thereto, first and second drive transmitting means coupled to said agitator and basket respectively, a linear motor supported by said frame and having a rotor, a source of respective first and second phases of alternating electrical power for energizing said motor; selectively operable means for both mechanically coupling said rotor and said first drive transmitting means to oscillate said agitator and for coupling said rotor and said second drive transmitting means to spin said basket; the improvement residing in a stator having a core of permeable material supported by said frame adjacent the rotor and extending over a segmental portion thereof; first and second windings respectively wound on said core; said first and second stator windings having a plurality of loops wound in spaced relationship on said shoes, said winding loops establishing respective field fluxes having a polarity dependent upon direction of current flow therein, loops in said first winding having corresponding, spatially displaced loops in said second winding so that upon energization of said respective windings with said voltages of different time phase a moving magnetic field is effected; first control means coupled to said first phase winding and operative to reverse current in selected ones of said loops of said first phase winding, and second control means coupled to said second phase winding operative to reverse current in selected ones of said loops in said second phase winding, reversal of current flow in selected ones of said winding loops in each of said phase windings establishing a predetermined different number of magnetic poles than before said reversal of current thereby effecting a different rotor speed.

6. In a washing machine comprising, in combination a frame, a tub for holding liquid supported by said frame, a basket rotatably mounted within said tub for receiving articles to be washed, an agitator mounted in said basket for relative movement with respect thereto, first and second drive transmitting means coupled to said agitator and basket respectively, a linear motor supported by said frame and having a rotor; a source of respective first and second phases of alternating electrical power for energizing said motor; selectively operable means for both mechanically coupling said rotor and said first drive transmitting means to oscillate said agitator and for coupling said rotor and said second drive transmitting means to spin said basket; the improvement residing in a stator having a core of permeable material supported by said frame adjacent the rotor periphery and extending over a segmental portion thereof, first and second windings respectively wound on said core; said first and second stator windings having a plurality of loops wound in spaced relationship on said core, said winding loops establishing respective field fluxes having a polarity dependent upon direction of current flow therein, loops in said first winding having corresponding spatially displaced loops in said second winding so that upon energization of said respective windings with said voltages of different time phase a moving magnetic field is effected, first current flow control means coupled to said first phase winding and operative between respective first and second positions for reversing current in selected ones of said loops in said first phase winding, and second current flow control means coupled to said second phase winding operative between respective first and second positions for reversing current in selected ones of said loops in said second phase winding, said first and second current control means in their respective first positions effecting current flow through said loops to establish a first number of magnetic poles, said first and second current control means in their respective second positions effecting current flow through said loops to establish a second number of magnetic poles less than said first number of magnetic poles so that rotor operates at a faster speed.

7. In a washing machine comprising, in combination a frame, a tub for holding liquid supported by said frame, a basket rotatably mounted within said tub for receiving articles to be washed, an agitator mounted in said basket for relative movement with respect thereto, first and second drive transmitting means coupled to said agitator and basket respectively, a linear motor supported by said frame and having a substantially flat rotor with a periphery, a source of respective first and second phases of alternating electrical power for energizing said motor, selectively operable means for both mechanically coupling said rotor and said first drive transmitting means to oscillate said agitator and for coupling said rotor and said first drive transmitting means to oscillate said agitator and for coupling said rotor and said second drive transmitting means to spin said basket, the improvement residing in a stator having upper and lower shoes of permeable material supported by said frame adjacent the rotor periphery and extending over a segmental portion of said rotor, first and second windings, respectively wound on said upper and lower stator shoes, a source of first and second phase voltages respectively for energizing said first and second windings respectively, said first and second stator windings having a plurality of loops wound in spaced relationship on said shoes, said winding loops establishing respective field fluxes having a polarity dependent upon direction of current flow therein, corresponding winding loops of the respective first and second windings positioned on said shoes in offset spatial relationship so that upon energization of said respective windings with said voltages of different time phase a moving magnetic field is effected, said winding loops being connected together into branches, each phase having a pair of branches on said respective upper and lower shoes, first control means coupled to said first phase winding and operative between respective first and second states to control direction of current flow in loops of one of said pair of first winding branches, second control means coupled to said second phase winding operative between respective first and second positions to control direction of current flow in loops of one of said pair of second winding branches, said first and second current control means in their respective first state effecting current flow through said loops to establish a first number of magnetic poles, said first and second current control means in their respective second state effecting current flow through said loops to establish a second number of magnetic poles less than said first number of magnetic poles so that said rotor operates at a faster speed.

8. The combination of claim 1 in which said armature includes respective magnetically permeable and electrically conductive portions, in spaced relationship with respect to said stator, said conductive portions positioned so as to establish high reluctance flux paths to flux traveling between adjacent flux stations of said stator on one side of said armature.

References Cited

UNITED STATES PATENTS

| | | | |
|---|---|---|---|
| 2,880,335 | 3/1959 | Dexter | 310—268 X |
| 2,896,144 | 7/1959 | Mollenberg | 318—224 |
| 2,959,721 | 11/1960 | Butler et al. | 318—224 X |
| 3,048,723 | 8/1962 | Watson | 310—268 X |
| 3,069,577 | 12/1962 | Lee | 310—268 X |
| 3,070,734 | 12/1962 | Rawcliffe | 318—224 |
| 3,194,032 | 7/1965 | Von Brimer | 68—23 |
| 3,233,160 | 2/1966 | Rawcliffe | 318—224 |

WILLIAM I. PRICE, *Primary Examiner.*